United States Patent Office.

JAMES J. JOHNSTON, OF ALLEGHENY CITY, PENNSYLVANIA.

Letters Patent No. 61,743, dated February 5, 1867; antedated January 18, 1867.

IMPROVEMENT IN THE MANUFACTURE OF IRON.

*The Schedule referred to in these Letters Patent and making part of the same.*

TO ALL WHOM IT MAY CONCERN:

Be it known that I, JAMES J. JOHNSTON, of the city and county of Allegheny, and State of Pennsylvania, have invented a new and useful Improvement in the Manufacture of Iron; and I do hereby declare that the following is a full and exact description thereof.

The nature of my invention consists in treating iron in the "puddling" or "boiling" process, with pulverized iron ore, manganese, red lead, borax, blue vitriol, salt, wood charcoal, and lye, said ingredients being compounded and used in the manner hereinafter described.

To enable others skilled in the art of manufacturing iron to make and use my invention, I will proceed to describe the manner of compounding it, and the mode of using the same in connection with the "puddling" or "boiling" process.

I take for each charge of 480 pounds of pig iron, which is the ordinary charge for each heat of the puddling or boiling furnace, of the ingredients named about as follows: 3 pounds of good iron ore, 1 pound of wood charcoal, 1 pound of manganese, 1 pound of red lead, 8 ounces of blue vitriol, 4 ounces of common salt, 3 ounces of borax, 2 ounces of lye made from potash. The iron ore, manganese, borax, salt, blue vitriol, red lead, and wood charcoal are each reduced separately to a fine powder. I then spread out the powdered charcoal and with a suitable device sprinkle the lye over the charcoal. I then in a most thorough manner mix up the charcoal thus sprinkled until all parts of the charcoal have become completely impregnated with the lye. I then place all of the ingredients in a suitable apparatus and agitate the whole mass together until a chemical attraction or affinity takes place between the particles of the unlike kinds, forming one common mass or chemical compound. I then divide this mass into two parts and pack it in good strong paper and seal it with glue or paste, taking care to have the packages long and narrow, so that they may be put into the furnace through the small opening in the furnace door with ease, and without liability of breaking the packages open. I then prepare the puddling or boiling furnace in the usual manner, and charge and melt down the charge of pig iron in the usual way, and when the iron is all melted down I place one of the packages on a suitable tool and drop it into the melted iron. I then work and manipulate the iron in the ordinary mode as practised by puddlers or boilers. I proceed in this manner for about five minutes, and then add the second package of the compound by the means described for the first, and proceed to work and manipulate the iron, working and mixing the compound well and thoroughly into and through the iron, but without any change whatever from the ordinary course pursued by the puddler or boiler, for the working and manipulation which are necessary to the perfect puddling or boiling process will in all cases be sufficient for mixing the compound into and through the melted iron. By the use of this chemical compound a good article of iron can be made of any ordinary pig iron without any change in the process of puddling or boiling, and without any injury whatever to the "fixing" of the puddling furnace; but on the contrary will, when the iron has a tendency to cut down and away the "fixing" of the furnace, so act on the iron as to destroy this cutting and injurious action of the iron on the "fix" of the furnace. Another advantage of this chemical compound is that it will greatly aid the puddler or boiler in bringing his "heat out in time," and will also cause the "ball" to work well in the "squeezers" and "muck-rolls."

Any desired combination of pig iron may be used in connection with this chemical compound, or any one kind of good pig iron may be used, and in each case the result obtained by the use of the chemical compound will be a good and uniform article of wrought iron. When the iron is "cold short" (I mean the pig iron) I omit the use of the lye, salt, borax, and blue vitriol, and increase the quantity of charcoal and red lead one hundred per cent., that is to say, instead of using one pound of each of these two ingredients, I use two pounds to each charge, but in all cases I prepare the compound in the manner before described, (simply omitting the four articles named,) using the compound in the manner stated for the first formula. After twenty-five experimental trials, the result in every case being uniform, said trials being made upon different kinds of pig iron, and without any change whatever in the puddling or boiling process, (other than simply using the compound herein described,) and without any change in the preparation or manipulation of the furnace, the following are the results and advantages obtained from the use of the chemical compounds herein described and set forth: first, a great improvement in the fibre, strength, and quality of the iron; second, the "red short" or "cold short" is destroyed in the iron, making it neither red or cold short, resembling the best "charcoal iron" in its working in the blacksmith's fire; third, the puddler or boiler, by the use of said compound, has no more labor to perform and is better able to get his "heat out in time;" fourth, the "puddled ball," when the iron is treated with the said compound, works better in the "squeezers" and "muck-rolls;" fifth, said compound does not cut away the "fixing" or injure the furnace; sixth, when the iron has a tendency to cut away the "fixing" and "works hard" on the furnace, this chemical compound will destroy such tendency and cause the iron to work smooth and easy on the "fix" and furnace; seventh, the results obtained are uniform when the compound is prepared as herein described and set forth.

I wish it clearly understood that I am aware that all of the ingredients herein named have been used in forming chemical compounds and used in connection with the manufacture of iron; but I am not aware of a chemical compound composed wholly of these, in the proportions stated, prepared in the manner described, and the whole when used in the quantities specified and prepared by being mixed, agitated, and triturated until the particles of unlike kinds so unite that a chemical attraction or affinity will take place between all the particles and form one homogeneous mass, the chemical action of which is to produce the results herein stated; therefore,

What I claim as of my invention, and desire to secure by Letters Patent, is—

Treating iron during the puddling or boiling process with a chemical compound composed of the ingredients herein named, in about the quantities specified, and prepared and used in the manner and form described and for the purpose set forth

JAMES J. JOHNSTON.

Witnesses:
 ALEXANDER HAYS,
 A. C. JOHNSTON.